Sept. 26, 1939.  F. M. GIVENS  2,174,464

AUTOMATIC BRAKE CONTROL MECHANISM

Filed March 23, 1935  5 Sheets—Sheet 1

Inventor

Frank M. Givens

By Lloyd W. Patch
Attorney

Sept. 26, 1939.　　　F. M. GIVENS　　　2,174,464
AUTOMATIC BRAKE CONTROL MECHANISM

Filed March 23, 1935　　5 Sheets-Sheet 3

Inventor
Frank M. Givens
By Lloyd W. Patch
Attorney

Sept. 26, 1939.　　　　F. M. GIVENS　　　　2,174,464
AUTOMATIC BRAKE CONTROL MECHANISM
Filed March 23, 1935　　　5 Sheets-Sheet 4

Inventor
*Frank M. Givens*
By *Lloyd W. Patch*
Attorney

Sept. 26, 1939. F. M. GIVENS 2,174,464
AUTOMATIC BRAKE CONTROL MECHANISM
Filed March 23, 1935 5 Sheets-Sheet 5

Inventor
Frank M. Givens
By Lloyd W. Patch
Attorney

Patented Sept. 26, 1939

2,174,464

UNITED STATES PATENT OFFICE 2,174,464

AUTOMATIC BRAKE CONTROL MECHANISM

Frank M. Givens, Nashville, Tenn.

Application March 23, 1935, Serial No. 12,694

8 Claims. (Cl. 188—110)

My invention relates to automatic brake control mechanism, and particularly to a device and mechanism of this character intended and adapted for use upon automobiles and upon other vehicles having inflated or pneumatic tires.

The primary object of my invention is to provide mechanism associated and cooperating with the brake system of the vehicle so that when any one of the normally inflated tires of the vehicle shall be deflated below the desired pressure, the brake mechanism immediately associated with the wheel mounting the deflated tire will be rendered ineffective or inoperative.

A further object resides in so constructing the parts that my invention can be applied and used in connection with hydraulic brakes, mechanical brakes, vacuum actuated brakes, and in fact substantially any and all of the commercial forms and types of brake mechanisms and brake systems.

Another object is to provide a mechanism which, while rendering ineffective the brake means of the wheel mounting the deflated tire, will yet permit normal operation of other brakes to apply braking force to other of the wheels of the vehicle to slow the motion thereof or to bring the vehicle to a stop.

Still another object is to so associate the parts that the actuation of my mechanism is automatic, and is not dependent upon any manual operation, impulse, reaction, or other human element or function or condition.

A still further purpose is to so construct and mount the parts that they can be applied to brake mechanism as already installed, and that means can be provided to indicate the condition, the operation and the functioning of the parts upon the instrument board of an automobile, or at some other point conveniently within the range of vision of the operator of the vehicle.

Yet another object lies in providing means whereby brake means affecting the wheel mounting the deflated tire will be automatically rendered ineffective, and at the same time brake mechanism operating upon other wheels of the vehicle will be automatically rendered operative.

With the above and other objects in view, which will be apparent to those skilled in the art, my present invention includes certain novel features of construction and combinations, arrangements and assembly of parts, which will be hereinafter set forth in connection with the drawings.

With the modern trend in the designing and construction of automobiles, and like vehicles, directed toward a desire for increased speed and at the same time increased riding comfort and greater absorption of road shocks, automobile wheels are being made smaller, tires are larger, and the cars are generally being built closer to the road. As the cross sectional area of the inflated tires is increased, the greater speed and the driving power necessary for attainment of this speed place greater strains upon the tire structures, in consequence of which a blow-out or other deflation of the tire will most often occur when the car is traveling at high speed, or at some other time when the consequent difficulty in holding the automobile to its course of travel makes any deviation particularly hazardous. With a low pressure inflated tire of the balloon, semi-balloon, air wheel, or semi-air wheel type, as such tires are now ordinarily made, a blow-out will cause deflation of the tire, and often results in the tire being thrown from the rim, in either case resulting in a drop of perhaps as much as six or eight inches of the wheel having the deflated tire. At the time time, the diameter of the wheel is correspondingly decreased, with the result that when braking force is applied thereto the wheel will often lock while those wheels having the tires inflated will continue to roll, due to a difference in diameter and the increased leverage thus applied to turn the wheel.

Where the average person is driving a car, there is an instinctive impulse to immediately apply the brakes, should any trouble develop. Where a blow-out, or other deflation of a tire, occurs, immediate application of braking force to the wheel mounting the deflated tire is positively dangerous and is often disastrous, and sometimes results in serious accident and serious injury or even death. Since this reaction to apply the brakes is instinctive and impulsive, and is not the result of reasoning or deliberate thought, manual control means is ineffective and insufficient to prevent the application of braking force to the wheel mounting the deflated or blown out tire, and it becomes necessary to provide automatically functioning means and mechanism to render the particular brake means ineffective, if it be desired to guard against the sudden, impulsive, and often involuntary application of braking force to the wheel mounting the deflated tire.

With the present trend toward increased sizes of tires, and with many manufacturers now producing cars having individually sprung or mounted front wheels, the hazard and danger of a blow-out occurring while the car is in motion and is traveling at a high speed is considerably increased, since the considerable drop due to deflation of the tire will often cause disarrangement or misalignment of other parts sufficient to result in unbalancing of the car weight or the dragging contact of some forward part sufficient to upend or somersault the car, with consequent danger and damage not only to the car alone, but often serious injury, and possibly fatal results to the driver and other occupants.

With this in mind, it is the primary purpose of my invention to provide mechanism that can be applied to a vehicle having wheels mounting inflated tires and provided with individual braking means, such as a four-wheel brake automobile, and which mechanism will be effective with mechanical, hydraulic, air, vacuum, and in fact any and all other types of brakes, to render ineffective the brake mechanism as it might, upon manual operation, apply braking force to a wheel having a blown out or otherwise deflated tire. This mechanism can be installed to render ineffective the brake mechanism only as it might operate upon the particular wheel having the deflated tire, or can be constructed to function to render ineffective the brake mechanism upon the wheel having the deflated tire and upon the correspondingly oppositely disposed wheel of the vehicle, and at the same time the brake mechanism is not rendered completely ineffective and inoperative, since the manually operated, or otherwise controlled, brake mechanism as applied to other wheels, or to other parts of the vehicle, will not be rendered ineffective.

In the present instance I have shown, and I shall describe, my invention as applied to and used in connection with hydraulic and mechanical brake systems, but it is to be understood that the present illustrations are only intended as disclosures of certain possible adaptations, and that my automatic brake control mechanism can be embodied, used, associated and employed with equal facility and effectiveness with substantially any and all forms, types, styles and arrangements of brake mechanism and brake systems, as these may be used upon automobiles and other vehicles having pneumatic or other inflated tires likely to become wholly or partially deflated through blow-outs and other causes.

This invention is designed primarily for the purpose of aiding the driver or operator to maintain a better and safer control of his vehicle following a blow-out or other accidental or casual deflation of a tire while the vehicle is in motion, provision being also made, if desired, to visibly indicate under inflation of a tire occurring at any time.

As has been stated, my invention is adaptable for use with mechanical, hydraulic, air, vacuum, and other types of brakes, and in any and all adaptations and installations the schematic arrangement will be substantially the same, the principal variations in different installation being occasioned by the requirements of the standard brake system, rather than by differences or modifications in the mechanism of my invention. Therefore, the schematic and diagrammatic showing in Figure 1 of the drawings can be taken as substantially illustrative of the embodiment of my invention. As here illustrated, the frame portion 1 is mounted and is carried in any desired manner by forward and rear wheels 2 and 3, which wheels have thereon ordinary inflated or pneumatic tires shown at 4 and 5 respectively. The brake system, of the four-wheel type, and either mechanically or fluid operated, or of any desired type, will be entirely optional and selective in the particular automobile or vehicle to which my invention is applied, and I have therefore not in this schematic disclosure atempted to illustrate fully and in detail any particular brake mechanism. Four-wheel brake installations are well known and it will suffice to say that this mechanism is adaptable to brake systems in which the brakes upon the several wheels are individually operated, as well as systems where the forward brakes are operated as a unit and the rear brakes are also simultaneously applied.

Figure 1:
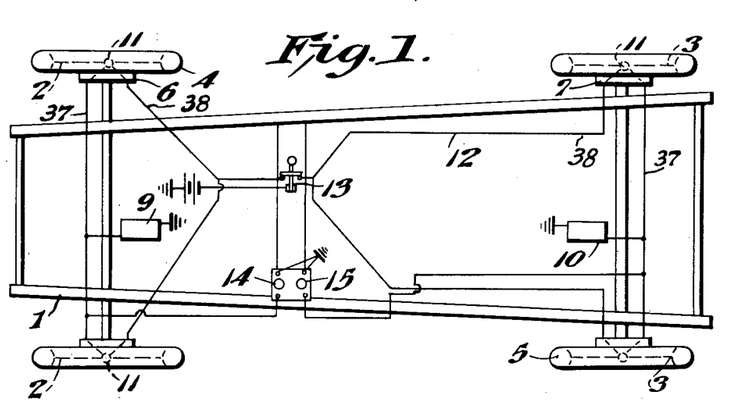
Figure 1 is a schematic and diagrammatic view showing one embodiment of my invention upon an automobile, and mainly illustrating an electric circuit wiring.

The front wheel brakes are roughly indicated at 6, and the rear wheel brakes at 7, and normally these brakes will be controlled through the medium of a foot pedal 8, or other manually actuated operating part. I have sketchily indicated a hydraulic brake system, and a front solenoid, electromagnet or other electrically energized means 9 is provided to actuate a valve, in manner to be hereinafter more fully set forth, to cut off and control the supply of brake fluid to operate the front brakes 6. A similar rear solenoid, electromagnet or other electrically energized means 10 is provided to control the supply of fluid to the rear brakes 7.

As has been explained, when the tire 4 upon one of the front wheels 2 blows out or otherwise becomes deflated, it is the purpose of my invention that the brake means of the wheel mounting the deflated tire shall be rendered inoperative or otherwise ineffective. At the same time, it will be found desirable or necessary to permit substantially normal operation of the rear brakes to slow down forward movement of the automobile and bring the vehicle to a stop. Should one of the tires 5 on one of the rear wheels 3 blow out or become under inflated to a degree precluding safe operation of the vehicle, the wheel 3 mounting the under inflated tire cannot have braking force safely applied thereto, and it is then essential that the brake means of the individual wheel, or possibly the brake means of both rear wheels, be rendered inoperative, while at the same time the front brake means will be left free for normal and unrestricted operation.

Figure 9:
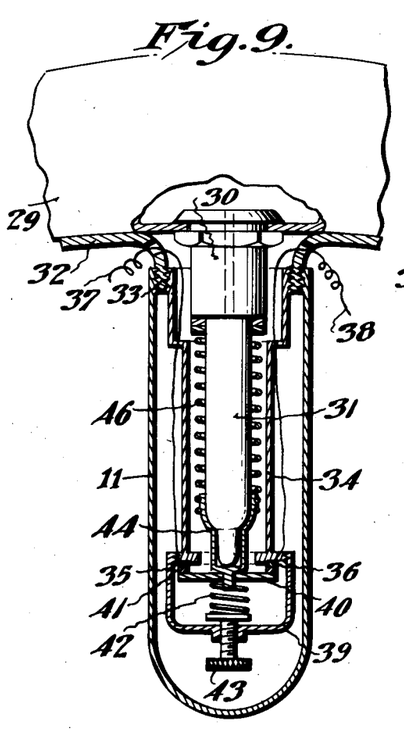
Fig. 9 is a fragmentary sectional view showing one of the pressure responsive switch mechanisms in circuit closing relation.
Figure 10:
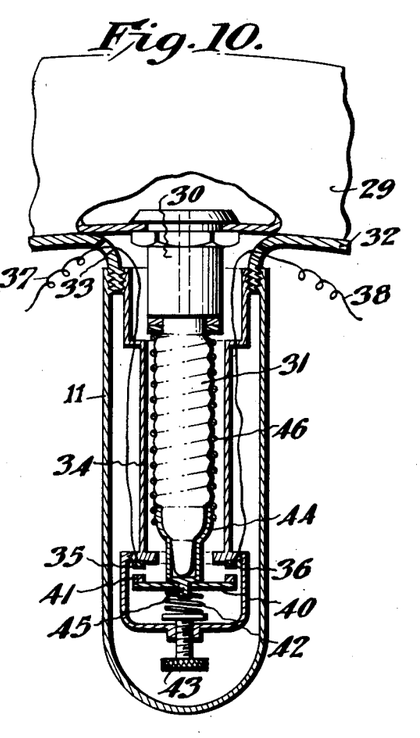
Fig. 10 is a view similar to Fig. 9 illustrating the parts in the normal opened relation.
Figure 16:
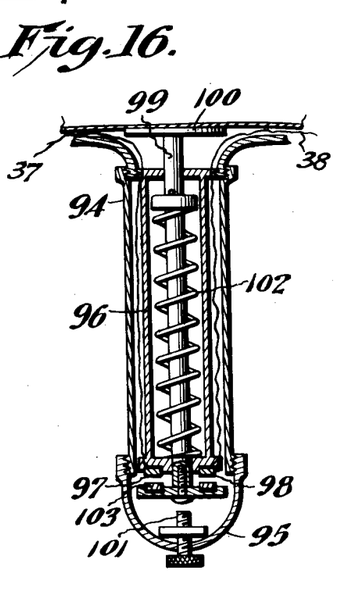
Fig. 16 is a view in section showing a modified form of pressure responsive switch mechanism, illustrating the parts in normal or open relation.

I have chosen the solenoids at 9 and 10 as convenient means for accomplishing control of the brake mechanism, and in order that these solenoids, and the parts associated therewith as shown in Figs. 2 to 8 and 12 to 14, may be effective, it is necessary that a suitable electric circuit be provided and some means responsive to partial deflation of each individual tire must be provided in the electric circuit to open and close circuit connections to the respective solenoids. With this in mind I provide in connection with each of the tires a pressure controlled and operated switch 11 forms of which are illustrated in Figs. 9, 10 and 16. Each of the pressure controlled switches associated with the front tires 4 will be effectively connected in the circuit to the solenoid 9, while the pressure responsive switch means associated with the two rear tires 5 will be effectively connected in the circuit to the solenoid 10. The wiring of the circuit 12 is preferably connected to be controlled by the switch 13 of the automobile, or by some other suitable switch means within the control of the operator, and if desired a separate switch can be provided so that the automobile brake control mechanism can be rendered operative or inoperative, as the individual user of the vehicle may desire.

It is perhaps preferable that some means be provided to indicate the partial deflation or complete deflation of a forward or rear tire, to thus give the occupant of the vehicle warning of the unsafe condition and of the fact that the brake mechanism has been automatically controlled, and with this in mind I have shown signal lights 14 and 15 connected in the circuits including the front and rear solenoids 9 and 10, so that visible indication will be given within the view of the operator to indicate energization of either the solenoid 9 or the solenoid 10, with consequent automatic control of the front or rear brakes. In this instance I have illustrated the front and the rear brakes controlled as a unit, and consequently a single signal for the front and a single signal for the rear will suffice.

Figures 2, 3:
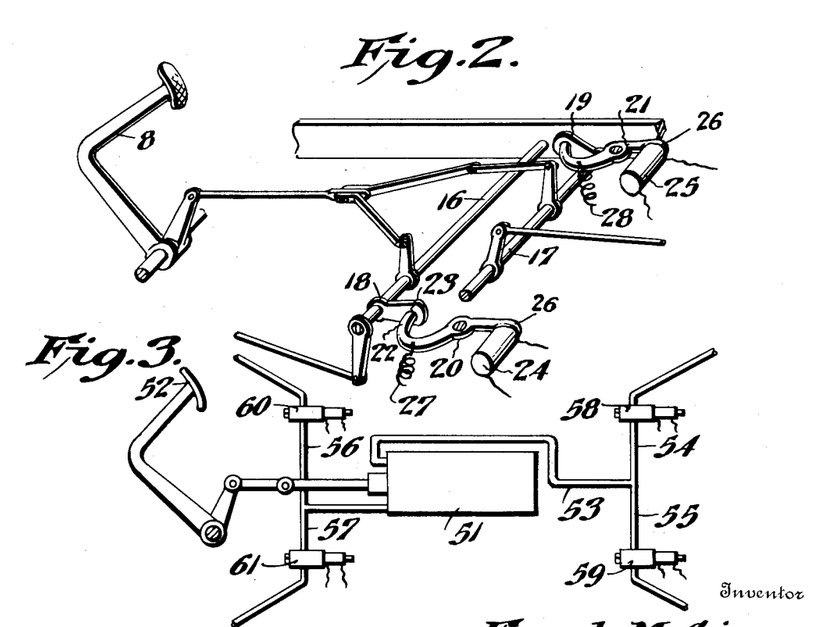
Fig. 2 is a perspective view, with parts broken away, showing adaptation of my invention to a mechanical brake system.
Fig. 3 is a schematic broken view showing one adaptation to a hydraulic brake system.
Figure 5:
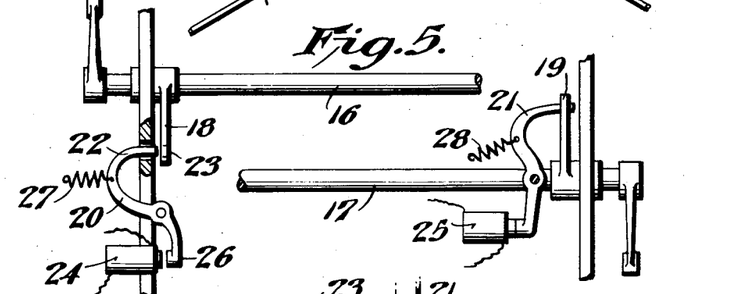
Fig. 5 is a fragmentary detail view to better show the automatic locking means to render forward and rear brakes inoperative.
Figures 6, 7, 8:
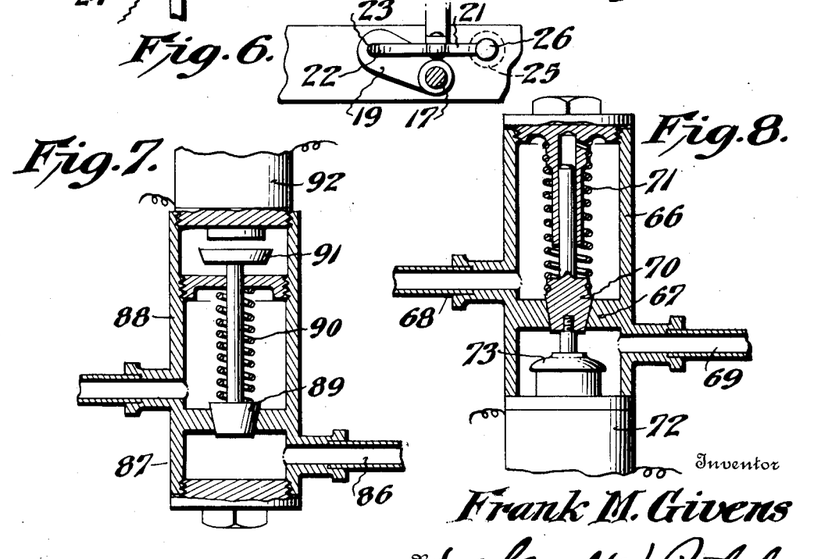
Fig. 6 is a detail view to better show one of the locking members.
Fig. 7 is a fragmentary sectional view illustrating one form of electrically energized and actuated valve adaptable for use with a fluid brake system.
Fig. 8 is a sectional view similar to the showing in Fig. 7 and illustrating a modified form of electrically energized and actuated valve.

In Figs. 2, 5 and 6 I have shown one form of structure adapted for use in rendering mechanically operated brakes ineffective, and in this instance the desired result is accomplished by locking either the forward brake setting shaft 16, or the rear brake setting shaft 17 against movement to apply the brakes. The shafts 16 and 17 have segments 18 and 19 mounted and fixed thereon to extend substantially radially, and lock levers 20 and 21 are swingably mounted on fixed portions of the frame structure in such relation that the locking pin ends 22 will register with and fit into openings 23 in the segments 18 and 19, when the locking levers 20 and 21 are swung toward the segments in the position occupied when the brakes are released. As stated, the electric circuit arrangement for all adaptations and embodiments can be substantially the same, and in the present instance the solenoids or electromagnets 24 and 25 are provided to attract the armature arms 26 of the locking levers 20 and 21 to move these locking levers to the locked position to retain the parts against brake setting or applying operation, when the circuit connection through either solenoid or electromagnet 24 or 25 is completed by under inflation or deflation of any tire permitting the pressure switch 11 associated therewith to close the circuit. Springs 27 and 28 are provided to exert resilient pull upon these locking levers 20 and 21 to normally swing the levers to positions in which the locking ends 22 thereof are entirely clear of the openings 23 in the segment arms 18 and 19.

It is necessary that some pressure influenced switch means be provided for each of the inflated tires, and that this be embodied in the circuit with the electromagnets 24 and 25. In Figs. 9 and 10 I have illustrated one form of switch means that may be used to advantage. Obviously, such switch means must be of a character that will readily adapt itself for use with pneumatic tires as now already in use, and which can be applied readily for use with standard forms of wheels and rims; and, at the same time, the switch means must permit ready placement and removal of the tire. As here shown, the inflatable tire or tube is disclosed at 29, and it will of course be understood that this illustration is more or less diagrammatic. An air tube 30 is connected with the tire portion 29, and this tube 30 can be attached substantially in the manner of the ordinary valve stem, or in any other way that may be suitable and desirable. The air tube 30 has associated therewith an inflatable pressure tube 31, which is of elongated form. The rim 32, or other suitable portion adjacent to the tire, is provided with a threaded flange 33 and a sleevelike casing member 34 is connected with this flange to extend substantially concentrically around the air pressure tube 31. At its end this sleeve 34 carries the two contacts 35 and 36, which are insulated from each other and from the remaining parts of the structure. Circuit wires 37 and 38 lead to and from the contacts 35 and 36, respectively. A cap or head 39 is provided on the outer end of the casing 34, and a contact disc 40 is located within this cap 39 and is provided with a contact ring 41 adapted to bear against the contacts 35 and 36, and to close the circuit across these contacts. The contact disc 40, which has an opening in its middle portion, is normally urged into engagement with the contacts 35 and 36 by a spring 42, and a screw 43 is preferably provided to adjust the tension of this spring 42. The air pressure bag 31 has a cap 44 fitted at its outer end and provided with a pin 45 loosely received in the opening of the contact disc 40, and a coil spring 46 fitted concentrically around the air pressure bag 31 is connected with the cap 44 at one end and with the air tube 30 at the other end. This spring 46 serves the dual purpose of limiting lateral expansion of the air pressure tube 31, and normally exerts resilient pull to retract the cap 44 toward the air tube 31 so that the contact disc 40 will be moved by spring 42 into position where the contact 41 thereof bridges across and connects the circuit through the contacts 35 and 36, and consequently completes the circuit through wires 37 and 38. This spring 46 encases the rubber bag to isolate the same from contact with the housing 34, to thus prevent the air bag from becoming cemented or sticking to the inner wall of this housing.

When the tire structure 29 is inflated, the air pressure tube 31 is also inflated, and consequently the tube is expanded laterally up to the full limits permitted by the cage like assembly of the spring 46. At the same time, the air pressure in the tire will cause this air pressure tube 31 to be elongated against the resilient pulling force exerted by spring 46, and the cap 44 bearing against contact disc 40 will move these parts to the position shown in Fig. 10, where the circuit through contacts 35 and 36 is broken. As stated, the screw 43 can be adjusted to vary the resilient force exerted by spring 42, or this screw might be extended into the spring to interpose its inner end as a positive stop to limit circuit breaking movement of the disc 40. When the pressure within the tire 29 is decreased below a point previously predetermined as the desired pressure, and upon which the resilient force exerted by the springs 46 and 42 is calibrated, the air pressure tube 31 will be accordingly and correspondingly deflated and the parts will then assume the positions and relations shown in Fig. 9, where the circuit connections are completed.

Figure 11:
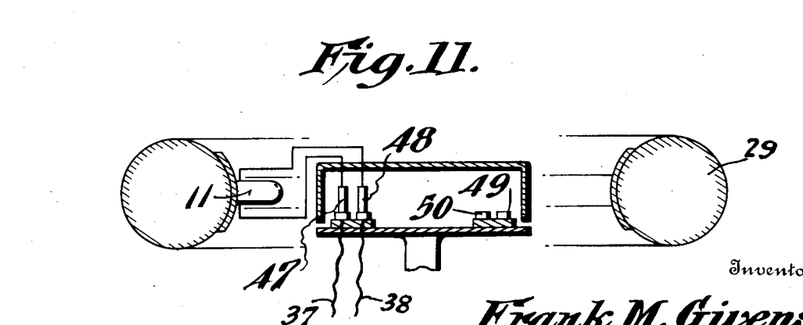
Fig. 11 is a transverse and somewhat schematic sectional view showing electric circuit conducting contacts and commutator structure adaptable for use at the wheels.

It is essential that the circuit through wires 37 and 38 be connected with the main control circuit on the chassis or frame of the car as this circuit has been hereinbefore described, and at the same time free rotation of the wheels must not be interfered with. While various forms of circuit conducting arrangements might be employed, in Fig. 11 of the drawings I have illustrated on adaptation that has been found efficient, and here the brushes 47 and 48 are carried by a suitable portion of the revolving wheel and contact or commutator rings 49 and 50 are provided on a suitable portion of the brake housing, or other part of the chassis structure, to be engaged by these brushes 47 and 48. The contact or commutator rings 49 and 50 will be connected in the circuit wires in manner that will be well understood, and in this way complete circuit wiring is provided from the pressure responsive device upon each revolving wheel to the parts carried by the chassis.

As has been stated, my invention is equally well suited for use in connection with fluid operated brakes, and in Fig. 3 I have illustrated, fragmentarily, adaptation of the invention in connection with a hydraulic brake system so that the individual wheel brake means will be rendered inoperative and consequently ineffective, should the tire upon any wheel blow out or become deflated or under inflated through any other cause. As here shown, the master brake cylinder 51 has the usual piston and other parts associated therewith, and operation of the brakes as a unit is accomplished through brake pedal 52. The main line pipes 53 lead from the master cylinder 51 and the pipes 54 and 55 branch from the main line pipe 53 to the individual brake cylinders of each of the rear wheels of the vehicle, while brake pipes 56 and 57 branch from the main line pipe to connect with the brake mechanism of each of the forward wheels of the vehicle. As several such brake systems and installations are now in extensive use and are well known, no attempt is here made to fully illustrate any particular system or to completely describe the parts. The wiring and the provision of pressure switch means will be substantially the same as has been set forth above, and electrically energized valves 58 and 59 are provided in the branch pipes 54 and 55, and electrically energized valves 60 and 61 are connected in the branch pipes 56 and 57. These valves are provided with electromagnet or solenoid operating means to close a valve when the circuit is completed therethrough, and normally the branch pipes to the several individual wheel brakes of the vehicle will be open for full, complete and normal operation of the entire brake system. Each of the electrically energized valves is connected in circuit wiring with the pressure controlled switch of the wheel to the brake of which the particular branch pipe is connected, and consequently since the pressure switch means is open to break the circuit when the tires are properly inflated, the several electrically energized valves will not in any way normally interfere with ordinary manual operation of the brake system. However, if any individual tire shall blow or become deflated or under inflated, the pressure controlled switch means of this individual tire will close the particular part of the circuit associated therewith, in consequence of which the particular electrically energized valve in the branch fluid supply pipe to the brake of the wheel carrying or mounting the partially deflated tire will be closed to cut off the supply of fluid to operate the brake means thereof. At the same time, while the individual brake means will be rendered inoperative or ineffective, the main braking system is still available for full normal and complete manual operation, in the usual manner.

Figure 4:
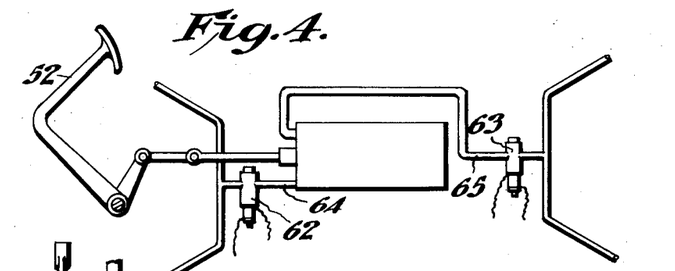
Fig. 4 is a view similar to Fig. 3 disclosing a modified adaptation to a hydraulic brake system.

In Fig. 4 I have illustrated a modified embodiment of the invention in which the electrically energized and closed valves 62 and 63 are provided in the front and rear brake fluid supply pipes 64 and 65. In this adaptation, the valves 62 and 63 will be connected in circuit wiring quite similar to that illustrated in Figure 1, and if either of the front wheel tires become under inflated, both front wheel brakes will be rendered inoperative, the rear wheel brakes being left for manual operation to retard and stop movement of the vehicle. Should one of the rear wheel tires become under inflated, both rear wheel brakes will be automatically rendered inoperative by closing of the valve 63, and the front wheel brakes will then be available for use in stopping the car.

Figure 12:
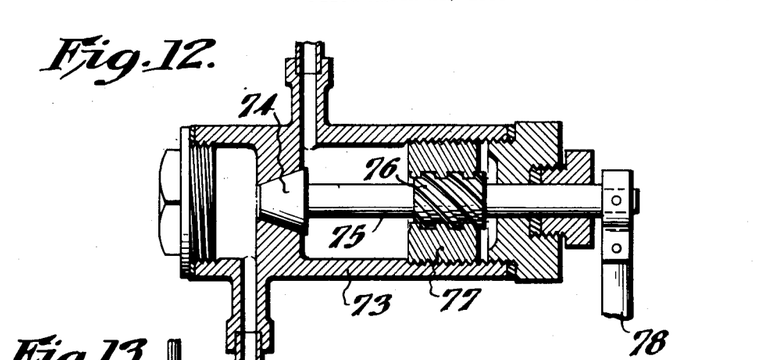
Fig. 12 is a fragmentary sectional view to show another form of valve adaptable for use in a fluid brake system.
Figure 13:
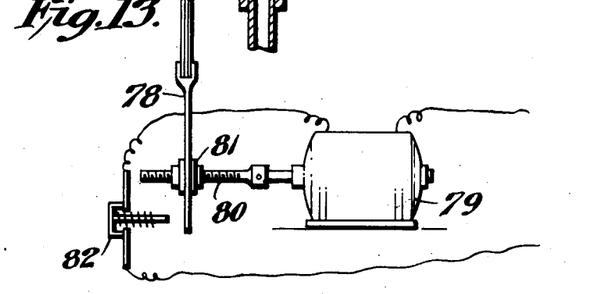
Fig. 13 is a fragmentary and somewhat schematic view showing motor operating means for the valve structure illustrated in Fig. 12.

When my improved automatic brake control mechanism is installed in connection with hydraulic or other fluid brakes, it is requisite that solenoid, electromagnet, or other electrically energized or operated valve structure be provided, and while there are various well known forms of electrically energized valves now on the market, I have in Fig. 8, and Figs. 12 and 13, shown two forms of electrically energized valves suitable for use in this connection.

As shown in Fig. 8, the valve casing 66 has a valve seat wall 67 therein with supply and discharge fluid pipes 68 and 69 connected with the case on opposite sides of this partition. A valve 70 adapted to seat in and close the fluid passage through said partition 67 has a spring 71 associated therewith to normally move the valve to an open position. An electromagnet 72 is associated with the valve case 66, and a pull piece 73 is carried by the valve 70 in position to be affected by and attracted toward the electromagnet when said magnet is energized. When this valve structure is installed in any one of the fluid lines of a fluid brake system, with the magnet 72 connected in the wiring system of one or a pair of wheels, the spring 71 will normally hold the valve 70 open to permit free passage of fluid through the pipe. Should the pressure switch of one of the wheels having a brake controlled by fluid pressure through the pipe line blow out or become deflated or under inflated from any other cause, the magnet 72 is immediately energized and the valve 70 is then immediately closed to cut off the fluid passage through the associated pipe line and consequently prevent operation of the associated brake means.

As the parts are shown in Figs. 12 and 13, the valve is intended and adapted to be closed by operation of an electric motor energized through closing of one of the pressure switch means of one of the wheels due to deflation or under inflation of the tire thereon. The valve casing 73 is somewhat similar to valve casing 66, and has connection in the fluid supply line to the particular brake portions to be controlled. Valve 74 is carried on a revoluble valve stem 75, which stem has thereon a worm thread portion 76 having the teeth thereof formed on a long helix. A collar 77 fixed in the valve case 73 has a central orifice constructed to receive and to fit the worm thread portion 76 of the stem 75, and consequently as the stem 75 is rotated, the worm thread portion 76 will cause rapid opening and closing of the valve 74 with respect to the appropriate seat provided therefor. A resilient arm 78, which can be made of a single resilient member, or of resilient laminae, is connected with the outer end of the valve stem 75 and extends radially therefrom. An electric motor 79 has a threaded shaft 80 rotatably associated therewith, and a correspondingly threaded nut or sleeve portion 81 is mounted on this threaded shaft 80 and is associated with the outer swinging end of the arm 78 in such manner that as the electric motor 79 is energized and shaft 80 is rotated, the arm 78 will be swung to rotate the valve stem 75 sufficiently to close the valve 74 and thus cut off the fluid supply pipe.

Where an electric motor is used and is installed in the manner set forth, the flexible arm 78 will yield sufficiently to prevent damage to or breakage of the parts, if the electric motor be stopped after it has swung the arm for a distance to close the valve, and to positively break the circuit and thus stop the motor 79, it is desirable that a snap switch 82, or other suitable form of switch means, be provided at such location that as the arm 78 is swung to the maximum position for closing the valve 74, this switch 82 will be opened to break the circuit line through the motor. The motor 79 is preferably of reversible type and is fitted with a manually or otherwise operated switch to permit reversal of the motor to reopen and swing the arm 78 in reverse direction to open the valve and reset the parts for automatic operation when the normal tire inflation is restored.

Figure 14:
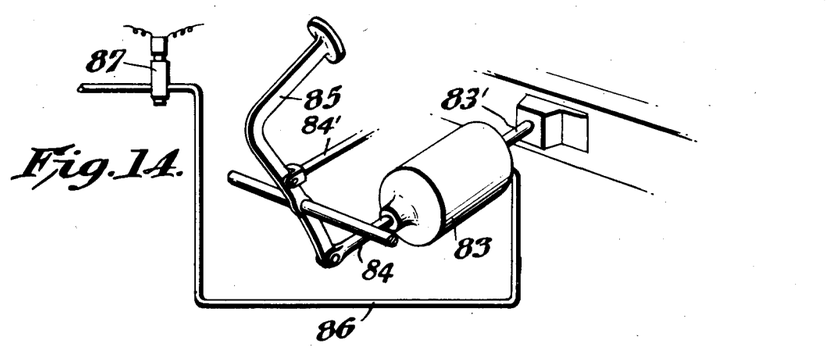
Fig. 14 is a fragmentary perspective view illustrating adaptation to a vacuum brake booster for automatic operation of the brakes not rendered inoperative.
Figure 15:
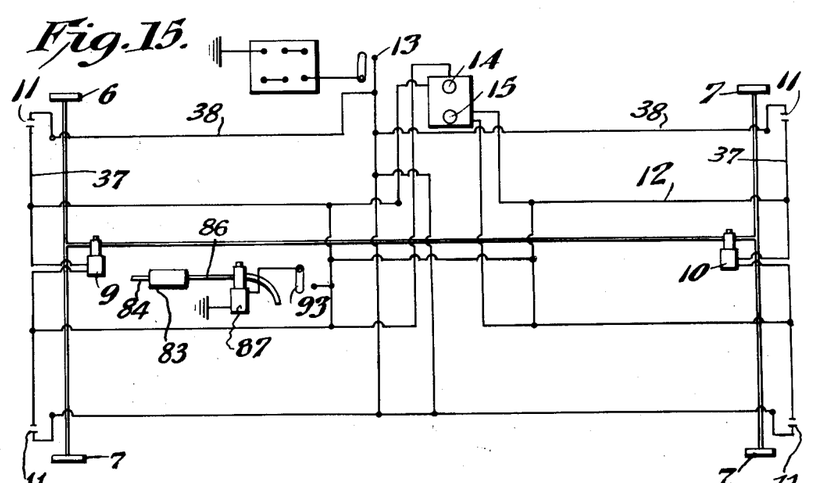
Fig. 15 is a diagrammatic view showing one circuit wiring suitable for the adaptation illustrated in Fig. 14.

As has been intimated, my invention is also capable of installation to automatically cut out or render ineffective any particular brake or pair of brakes, and at the same time to automatically initiate action of, or set, other brakes of the vehicle, and such an adaptation is disclosed in Figs. 14 and 15. The brake mechanism, the arrangement of the pressure controlled switches, the association of electrically operated valves or electrically operated mechanical means, and in fact all parts of the structure, can be as set forth above. Where automatic application of the brakes is required, it will be necessary to provide a vacuum brake setting means, or the like. As shown in Fig. 14, the vacuum cylinder 83 supported by bracket 83' has the piston rod 84 thereof extending and associated with brake applying mechanism in any desired manner, several applications of this structure being now well known. The foot pedal 85 having drawrod 84' connected therefrom to the brakes, provides for normal manual control of this vacuum actuated means, and connection is had to the inlet manifold, or other appropriate part of the engine, through a supplemental vacuum line 86, corresponding substantially to the ordinary vacuum line, and electrically actuated valve 87 is provided in this supplemental vacuum line 86, which valve will normally be closed, while the tires are properly inflated, to thus permit normal manual actuation of the brake through the foot pedal 85. It will be appreciated that the structure and mechanism of my invention can be embodied with many types and forms and constructions of brake mechanism and operating means therefor, and therefore the present illustration showing and descriptions are intended to be illustrative and no attempt is made to show or mention all possible forms or to illustrate details of construction and adaptation. In Fig. 7 I have shown a valve structure well adapted for use in this connection, and the valve casing 88 has the vacuum line 86 connected therewith on opposite sides of a partition having a valve seat opening therethrough. Valve 89 is normally urged to a seated or closed position by pressure spring 90, and a pull piece 91 on the stem of valve 89 is positioned to be influenced by and attracted toward a solenoid, electromagnet, or other electrically energized means 92. With this arrangement of the valve, the supplemental vacuum line 86 is normally closed, and when the circuit is closed through one of the associated pressure controlled switches, the means 92 is energized and the valve 89 is moved from its closed or seated position.

Figure 17:
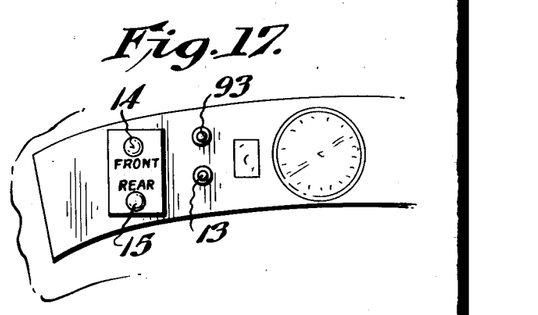
Fig. 17 is a fragmentary view in elevation disclosing an automobile dash with one form of indicating means to show to the occupant actuation of the parts.

As shown in Figs. 15 and 17, it is desirable that a manually controlled switch 93 be provided upon the dash of the automobile, or at some other point conveniently accessible to an occupant of the vehicle, so that when the brake means is automatically rendered operative to apply the brakes for stopping the vehicle, the possibility and danger of the vehicle being stopped upon a railway crossing, at a street intersection, or at some other undesirable place can be avoided by opening the switch 93 by which the automatic brake setting means is rendered inoperative, and then the usual manual brake control means can be employed and will be fully effective, except as to such portions rendered ineffective by deflation or under inflation of a particular tire.

In Fig. 16, I have illustrated another form of pressure switch that can be used to advantage, and here a casing 94 is carried by the wheel rim, or other suitable portion of the wheel, to extend substantially radially with its outer end opening adjacent to the inflated tire and with its inner end preferably closed by cap 95. A mounting sleeve 96 within the casing 94 has carried at its lower end contacts 97 and 98, which contacts are insulated from each other and from the remaining portions of the structure, and are suitably connected in the circuit wiring in the manner heretofore set forth. A stem 99 is mounted for endwise sliding movement within the supporting sleeve 96 and has a plunger head 100 on one end thereof to be in contact with the inflated tire. This stem 99 has a head 101 at its remaining end provided with a contact ring or other portion that will engage with and bridge across the contacts 97 and 98 to thus complete the circuit, when the stem 99 and the head 100 have moved endwise. A compression spring 102 is provided to normally urge the stem 99 to move to a position to cause engagement of contact 103 with the contacts 97 and 98, to thus complete the circuit. When this particular form or pressure switch is in use, the inflation of the tire will exert pressure upon head 100 to cause stem 99 to be moved against the resilient compression force of spring 102, to such position that the contact member 103 of the head 101 is separated from contacts 97 and 98, in consequence of which the circuit is broken. When the tire becomes deflated or under inflated, the carefully gauged and regulated spring 102 will exert sufficient force to move the parts to the circuit closing or completing position, and then the circuit will be completed to energize the means rendering the particular associated brake means ineffective.

The circuit wires on the automobile wheels can be led through hollow spokes, or can be otherwise disposed and housed to prevent injury to the system, and in fact all parts can be so mounted, associated and protected, that the mechanism will meet the conditions and shocks of ordinary use of the vehicle without being injured or rendered inoperative or ineffective.

While I have herein shown and described only certain specific embodiments, adaptations and associations of my invention, and have suggested only certain possible modifications, it will be appreciated that many changes can be made and resorted to in the form, construction, arrangement, assembly and association of the parts, and in the manner of installing the mechanism upon a vehicle, to suit various requirements of use, without departing from the spirit and scope of my invention.

I claim:

1. With an automobile having inflated tires upon the wheels thereof and provided with brake mechanism operative to apply braking force to the wheels, air pressure controlled means actuated by partial deflation of a tire upon one of the wheels to render inoperative the brake mechanism of the set of wheels including the wheel mounting said tire.

2. With an automobile having inflated tires upon the wheels thereof and provided with brakes operative to apply braking force to the wheels, air pressure operated means actuated by partial deflation of a tire upon one of the wheels to render inoperative the brake mechanism to the set of wheels including the wheel mounting said tire, and means to indicate to an occupant of the vehicle the particular set of wheel brake means thus rendered inoperative.

3. With an automobile having normally inflated tires on the wheels thereof and provided with brake mechanism operable to apply braking force to the wheels, manually actuatable means to operate normally to simultaneously apply the brakes upon the several wheels, air pressure responsive and actuated means automatically effective upon partial deflation of the tire upon any individual wheel to render inoperative the brake structure associated with the set of wheels including said wheel and at the same time allow free and normal operation of the brake means to apply the brakes upon other wheels of the vehicle, and means to indicate to an occupant of the vehicle the particular set of wheel brake structures rendered inoperative.

4. With an automobile having inflated tires upon the wheels thereof and provided with brakes operable to apply braking force to said wheels, air pressure operated means automatically actuated by partial deflation of any individual tire to render inoperative the brake mechanism to the wheel mounting the partially deflated tire, and means also automatically actuated to apply the brakes affecting other wheels of the automobile.

5. With an automobile having normally inflated tires on the wheels thereof and provided with brake mechanism operable to apply braking force to the forward wheels and to the rear wheels, manually actuatable means to normally operate the brake mechanism simultaneously upon the several wheels, air pressure responsive and actuated means automatically effective upon partial deflation of the tire upon any individual wheel to render inoperative the brake mechanism associated with said wheel, and means also automatically effective by partial deflation of any tire to operate the brake mechanism to apply braking force to other of the wheels of the automobile.

6. With an automobile having inflated tires upon the wheels thereof and provided with forward and rear wheel brake mechanisms, means to render the forward brakes inoperative, means to render the rear brakes inoperative, and air pressure controlled means actuated by partial deflation of a tire upon one of the wheels whereby the means to render the brakes inoperative to the particular set including the wheel having the deflated tire will be actuated.

7. With an automobile having inflated tires upon the wheels thereof and provided with brake mechanism operative to apply braking force to the wheels, electrically actuated means to render inoperative the brake mechanism to the forward wheels of the vehicle, electrically actuated means to render the brakes of the rear wheels inoperative, and pressure controlled switch means associated with each tire and connected in the circuits of the respective electrically actuated means actuated by partial deflation of a tire to cause operation of the electrically actuated means to render inoperative the brakes to the set of wheels including the wheel having the deflated tire.

8. With an automobile having inflated tires upon the wheels thereof and provided with brake mechanism operative to apply braking force to the wheels, electrically actuated means to render inoperative the brake mechanism to the forward wheels of the vehicle, electrically actuated means to render the brakes of the rear wheels inoperative, pressure controlled switch means associated with each tire and connected in the circuits of the respective electrically actuated means actuated by partial deflation of a tire to cause operation of the electrically actuated means to render inoperative the brakes to the set of wheels including the wheel having the deflated tire, and electrically energized means to indicate to an occupant of the vehicle the particular set of wheel brake means thus rendered inoperative.

FRANK M. GIVENS.